United States Patent
Chen et al.

(10) Patent No.: US 12,541,037 B2
(45) Date of Patent: Feb. 3, 2026

(54) SYSTEM AND METHOD OF PERFORMING SECURITY INSPECTION OF HUMAN BODY BASED ON MILLIMETER-WAVE

(71) Applicants: Tsinghua University, Beijing (CN); NUCTECH COMPANY LIMITED, Beijing (CN)

(72) Inventors: Zhiqiang Chen, Beijing (CN); Ziran Zhao, Beijing (CN); Yingkang Jin, Beijing (CN); Xiaoyi He, Beijing (CN); Mengjiao Zhao, Beijing (CN); Zhimin Zheng, Beijing (CN); Yihai Zhang, Beijing (CN); Yaning Li, Beijing (CN); Xiaoxiao Feng, Beijing (CN)

(73) Assignees: Tsinghua University, Beijing (CN); NUCTECH COMPANY LIMITED, Beijing (CN)

( * ) Notice: Subject to any disclaimer, the term of this patent is extended or adjusted under 35 U.S.C. 154(b) by 259 days.

(21) Appl. No.: 18/034,349

(22) PCT Filed: Sep. 30, 2021

(86) PCT No.: PCT/CN2021/122079
§ 371 (c)(1),
(2) Date: Apr. 27, 2023

(87) PCT Pub. No.: WO2022/089150
PCT Pub. Date: May 5, 2022

(65) Prior Publication Data
US 2023/0384475 A1   Nov. 30, 2023

(30) Foreign Application Priority Data
Oct. 28, 2020 (CN) .......................... 202011178188.0

(51) Int. Cl.
*G01V 8/00* (2006.01)
*G01S 13/88* (2006.01)
(Continued)

(52) U.S. Cl.
CPC ............ *G01V 8/005* (2013.01); *G01S 13/887* (2013.01); *G01S 13/89* (2013.01); *G01V 8/10* (2013.01)

(58) Field of Classification Search
CPC . G01V 8/005; G01V 8/10; G01V 5/00; G01V 8/00; G01S 13/887; G01S 13/89;
(Continued)

(56) References Cited

U.S. PATENT DOCUMENTS 7,365,672 B2   4/2008 Keller et al.
2014/0184773 A1   7/2014 Chen et al.
(Continued)

FOREIGN PATENT DOCUMENTS

BR   102014011755 A2 * 11/2015 ............... G01V 8/20
CA   2793229 A1   9/2011
(Continued)

OTHER PUBLICATIONS

Zheng, Cheng, et al. "Initial results of a passive millimeter-wave imager used for concealed weapon detection BHU-2D-U." Progress In Electromagnetics Research C 43 (2013): 151-163. (Year: 2013).*
(Continued)

*Primary Examiner* — Edwin C Gunberg
*Assistant Examiner* — Richard O Toohey
(74) *Attorney, Agent, or Firm* — Merchant & Gould P.C.

(57) ABSTRACT

A method and a system of performing security inspection of human body based on millimeter-wave. The method includes: displaying, by a first display device, information related to a designated posture to a person to be inspected before the person enters an inspection channel defined by a
(Continued)

millimeter-wave human body security inspection instrument, the designated posture being expected to be taken by the person when scanning the person with the instrument; guiding the person to enter the inspection channel and stand at a designated standing position within the inspection channel in a standing posture substantially complying with the designated posture; scanning, by the instrument, the person, to obtain millimeter-wave scanning data; and performing, by a workstation, a reconstruction of millimeter-wave scanning image of the person, a confirmation for the standing posture of the person, and a recognition of a suspected item of the person, based on the millimeter-wave scanning data.

18 Claims, 5 Drawing Sheets

(51) Int. Cl.
 *G01S 13/89* (2006.01)
 *G01V 8/10* (2006.01)
(58) Field of Classification Search
 CPC ........ G01S 13/426; G01S 7/10; G01S 13/867; G01S 13/88
 See application file for complete search history.

(56) References Cited

U.S. PATENT DOCUMENTS

| | | |
|---|---|---|
| 2016/0216371 A1 | 7/2016 | Ahmed et al. |
| 2018/0173161 A1 | 6/2018 | Chen et al. |
| 2020/0311429 A1 | 10/2020 | Chen |
| 2022/0221576 A1* | 7/2022 | Zhao ..................... G01S 13/887 |
| 2024/0036230 A1* | 2/2024 | Jin ....................... G06V 40/103 |
| 2024/0184773 A1 | 6/2024 | Malik et al. |

FOREIGN PATENT DOCUMENTS

| | | |
|---|---|---|
| CN | 101599186 A | 12/2009 |
| CN | 103901490 A | 7/2014 |
| CN | 107869967 A | 4/2018 |
| CN | 108324296 A | 7/2018 |
| CN | 108960102 A | 12/2018 |
| CN | 109031445 A | 12/2018 |
| CN | 109358378 A | 2/2019 |
| CN | 109709617 A | 5/2019 |
| CN | 109799500 A | 5/2019 |
| CN | 110007360 A | 7/2019 |
| CN | 110956704 A | 4/2020 |
| CN | 210982777 U | 7/2020 |
| CN | 111553310 A | 8/2020 |
| DE | 102014210227 A1 | 7/2015 |
| ES | 2611976 A1 | 5/2017 |
| GB | 2509402 A * | 7/2014 ........... G01S 13/887 |
| JP | 2018013448 A | 1/2018 |

OTHER PUBLICATIONS

"How it Works: Airport Body Scanner." YouTube uploaded by City of Bloomington, Minnesota. Jun. 4, 2014. https://www.youtube.com/watch?v=530Xv_EKnKs (Year: 2014).*
Office Action issued in corresponding Chinese Application No. 202011178188.0 dated Aug. 8, 2024 (17 pages including English Translation).
Office Action dated Apr. 2, 2024 for corresponding Japanese Application No. 2023-526394 (9 pages including English Translation).
Examination Report dated Nov. 22, 2024 for corresponding Great Britain Application No. 2307957.7, 4 pgs.
Allegra Stratton, "Full-body scanners being ordered for airports, says Gordon Brown", The Guardian, available from https://www.theguardian.com/world/2010/jan/03/gordon-brown-airport-body-scanners, Jan. 3, 2010, 5 pages.
International Search Report with Written Opinion for PCT application No. PCT/CN2021/122079 (7 pages).
English Translation of International Search Report for PCT Application No. PCT/CN2021/122079 mailed Nov. 24, 2021 (2 pages).
Office Action for corresponding Korean Patent Application No. 10-2023-7017547 issued on Apr. 11, 2025 (11 pages including English Translation).

* cited by examiner

SYSTEM AND METHOD OF PERFORMING SECURITY INSPECTION OF HUMAN BODY BASED ON MILLIMETER-WAVE

This application is a National Stage Application of International Application No. PCT/CN2021/122079, filed 30 Sep. 2021, which claims benefit of Ser. No. 202011178188.0, filed 28 Oct. 2020 in China, and which applications are incorporated herein by reference. To the extent appropriate, a claim of priority is made to each of the above disclosed applications.

TECHNICAL FIELD

Embodiments of the present disclosure generally relate to a field of security inspection, and in particular, to a system and a method of performing security inspection of human body based on millimeter-wave for improving a passing rate of security inspection.

BACKGROUND

In order to ensure public safety, security inspections in important public places are a necessary means. At present, the most widely used imaging security technologies are mainly X-ray imaging technology and millimeter-wave imaging technology. A millimeter-wave detection and imaging technology has many advantages, such as no harm to a human body in use due to non-ionizing radiation, penetrating human clothing, and recognizing various metal and non-metal prohibited items. In recent years, with a development of millimeter-wave technology and a reduction of device cost, the millimeter-wave imaging has been widely used in a field of human body security inspection.

Although a millimeter-wave security inspection instrument has a series of advantages compared to a metal detection gate, there are still problems such as a person to be inspected is required to be scanned in a stopped state and an efficiency of passing is low. In a practical security inspection, for an existing active millimeter-wave imaging system, it is required that the person to be inspected stands in a designated posture for a certain period of time in front of the security inspection instrument or rotates in a designated posture in front of the security inspection instrument. Although a high recognition rate can be ensured, the person to be inspected is required to continuously adjust his/her standing posture and stays within an inspection channel for a long time, thereby limiting the passing rate.

SUMMARY

According to an aspect of the present disclosure, a method of performing security inspection of human body based on millimeter-wave is provided, including: displaying, by a first display device, information related to a designated posture to a person to be inspected before the person to be inspected enters an inspection channel defined by a millimeter-wave human body security inspection instrument, wherein the designated posture is expected to be taken by the person to be inspected when scanning the person to be inspected with the millimeter-wave human body security inspection instrument; guiding the person to be inspected to enter the inspection channel and stand at a designated standing position within the inspection channel in a standing posture substantially complying with the designated posture; scanning, by the millimeter-wave human body security inspection instrument, the person to be inspected, so as to obtain millimeter-wave scanning data of the person to be inspected; and performing, by a workstation, a reconstruction of millimeter-wave scanning image of the person to be inspected, a confirmation for the standing posture of the person to be inspected, and a recognition of a suspected item of the person to be inspected, based on the millimeter-wave scanning data.

In some embodiments, the first display device is disposed at a top of the millimeter-wave human body security inspection instrument, so as to allow the person to be inspected to see the information displayed by the first display device before entering the inspection channel.

In some embodiments, at least one of a video of posing the designated posture, a text of prompting the designated posture, or a picture of the designated posture is displayed to the person to be inspected by the first display device.

In some embodiments, the method further includes displaying, by a second display device, information related to the designated posture to the person to be inspected standing at the designated standing position within the inspection channel.

In some embodiments, an image of a character in the designated posture is displayed by the second display device, and the method further includes: acquiring a visible light image of the person to be inspected standing at the designated standing position in the standing posture, and displaying the visible light image on the second display device, so as to guide the person to be inspected to adjust the standing posture of the person to be inspected according to a comparison between the visible light image and the image of the character in the designated posture.

In some embodiments, the method further includes: guiding, by an audio device, the person to be inspected to see the information displayed by the first display device, and/or to stand at the designated standing position in the standing posture substantially complying with the designated posture through a voice prompt.

In some embodiments, determining whether the standing posture of the person to be inspected meets a requirement of the designated posture or not is performed based on a reconstructed millimeter-wave scanning image.

In some embodiments, the method further includes: guiding the person to be inspected to leave the inspection channel after determining that the standing posture of the person to be inspected meets a requirement of the designated posture; and analyzing a reconstructed millimeter-wave scanning image to recognize whether the person to be inspected is carrying the suspected item or not when the person to be inspected is leaving the inspection channel.

In some embodiments, the method further includes: performing, by a graphics processing unit at the workstation, the reconstruction of millimeter-wave scanning image of the person to be inspected, the confirmation for the standing posture of the person to be inspected and the recognition of the suspected item of the person to be inspected.

In some embodiments, the method further includes:
  acquiring a first scanning dataset related to a front of the person to be inspected and a second scanning dataset related to a back of the person to be inspected, wherein a column direction of the first scanning dataset and a column direction of the second scanning dataset are identical to a height direction of the person to be inspected;
  combining columns of the first scanning dataset to obtain a column of first combined data represented by Y1, and combining columns of the second scanning dataset to obtain a column of second combined data represented by Y2;

performing a cross-correlation operation on the first combined data Y1 and the second combined data Y2 according to an equation:

$$R(\tau)=\int Y_1(t)Y_2(t+\tau)dt$$

where t is a height corresponding to the first combined data Y1 or the second combined data Y2: and determining a value of $\tau$ corresponding to a maximum of $R(\tau)$ as a height difference between the first scanning dataset and the second scanning dataset, and performing a registration between the first scanning dataset and the second scanning dataset based on the height difference, so as to perform the reconstruction of millimeter-wave scanning image of the person to be inspected.

According to another aspect of the present disclosure, a system of performing security inspection of human body based on millimeter-wave is provided, including: a millimeter-wave human body security inspection instrument, wherein the millimeter-wave human body security inspection instrument defines an inspection channel, and is configured to scan a person to be inspected standing at a designated standing position within the inspection channel, so as to acquire millimeter-wave scanning data of the person to be inspected; a first display device disposed at a position which is viewable by the person to be inspected before the person to be inspected enters the inspection channel, wherein the first display device is configured to display information related to a designated posture, which is expected to be taken by the person to be inspected when scanning the person to be inspected with the millimeter-wave human body security inspection instrument; and a workstation configured to perform a reconstruction of millimeter-wave scanning image of the person to be inspected, a confirmation for a standing posture of the person to be inspected and a recognition of a suspected item of the person to be inspected based on the millimeter-wave scanning data.

In some embodiments, the first display device is disposed at a top of the millimeter-wave human body security inspection instrument to face to the person to be inspected being about to enter the inspection channel.

In some embodiments, each of two opposite tops of the millimeter-wave human body security inspection instrument is provided with the first display device in a passing direction of the person to be inspected.

In some embodiments, the first display device is configured to display at least one of a video of posing the designated posture, a text of prompting the designated posture, or a picture of the designated posture to the person to be inspected.

In some embodiments, the system of performing security inspection of human body based on millimeter-wave further includes: a second display device disposed within the inspection channel to display information related to the designated posture to the person to be inspected standing at the designated standing position.

In some embodiments, the system of performing security inspection of human body based on millimeter-wave further includes: a visible light imaging device configured to acquire a visible light image of the person to be inspected standing at the designated standing position in the standing posture, and the second display device is configured to display an image of a character in the designated posture and the visible light image to guide the person to be inspected to adjust the standing posture of the person to be inspected according to a comparison between the visible light image and the image of the character in the designated posture.

In some embodiments, the system of performing security inspection of human body based on millimeter-wave further includes: an audio device configured to guide the person to be inspected to see the information displayed by the first display device, and/or to stand at the designated standing position in the standing posture substantially complying with the designated posture through a voice prompt.

In some embodiments, the workstation is configured to determine whether the standing posture of the person to be inspected meets a requirement of the designated posture or not based on a reconstructed millimeter-wave scanning image.

In some embodiments, the system of performing security inspection of human body based on millimeter-wave is configured to guide the person to be inspected to leave the inspection channel through a voice prompt and/or a visual prompt after determining that the standing posture of the person to be inspected meets a requirement of the designated posture; and the workstation is configured to analyze a reconstructed millimeter-wave scanning image to recognize whether the person to be inspected is carrying the suspected item or not when the person to be inspected is leaving the inspection channel.

In some embodiments, the workstation includes a graphics processing unit configured to perform the reconstruction of millimeter-wave scanning image of the person to be inspected, the confirmation for the standing posture of the person to be inspected and the recognition of the suspected item of the person to be inspected.

In some embodiments, the millimeter-wave human body security inspection instrument includes:

a first millimeter-wave scanning unit and a second millimeter-wave scanning unit on opposite sides of the inspection channel in a horizontal direction perpendicular to a direction of the person to be inspected passing through the inspection channel, wherein the first millimeter-wave scanning unit and the second millimeter-wave scanning unit are configured to perform millimeter-wave scanning on a front of the person to be inspected and a back of the person to be inspected standing at the designated standing position in the standing posture complying with the designated posture, respectively, so as to obtain a first scanning dataset related to the front of the person to be inspected and a second scanning dataset related to the back of the person to be inspected, wherein a column direction of the first scanning dataset and a column direction of the second scanning dataset are identical to a height direction of the person to be inspected, and the workstation is further configured to:

combine, in a row direction of the first scanning dataset, columns of the first scanning dataset to obtain a column of first combined data represented by Y1, and combine, in a row direction of the second scanning dataset, columns of the second scanning dataset to obtain a column of second combined data represented by Y2;

perform a cross-correlation operation on the first combined data Y1 and the second combined data Y2 according to an equation:

$$R(\tau)=\int Y_1(t)Y_2(t+\tau)dt$$

where t is a height corresponding to the first combined data Y1 or the second combined data Y2; and determine a value of $\tau$ corresponding to a maximum of $R(\tau)$ as a height difference between the first scanning dataset and the second scanning dataset, and perform a registration between the first scanning dataset and the second scanning dataset based on the height difference, so as to perform the reconstruction of millimeter-wave scanning image of the person to be inspected.

Other objects and advantages of the present disclosure will be apparent from the following detailed description of the present disclosure with reference to the accompanying drawings, and may assist in a comprehensive understanding of the present disclosure.

BRIEF DESCRIPTION OF THE DRAWINGS

The features and advantages of the present disclosure may be more clearly understood with reference to accompanying drawings, and the accompanying drawings are schematic and should not be construed as any limitation on the present disclosure, in which.

DETAILED DESCRIPTION OF EMBODIMENTS

With reference to accompanying drawings in embodiments of the present disclosure, the technical solution in embodiments of the present disclosure will be described clearly and completely. Apparently, embodiments described are only some embodiments of the present disclosure, rather than all embodiments. Based on embodiments in the present disclosure, all other embodiments derived by those of ordinary skill in the art without creative labor, fall within the scope of protection of the present disclosure.

In addition, in the following detailed descriptions, for purposes of explanation, many specific details are elaborated to provide a comprehensive understanding of embodiments of the present disclosure. However, it is clearly that one or more embodiments may be implemented without these specific details. In other cases, well-known structures and devices are illustrated to simplify the accompanying drawings.

Figure 1:
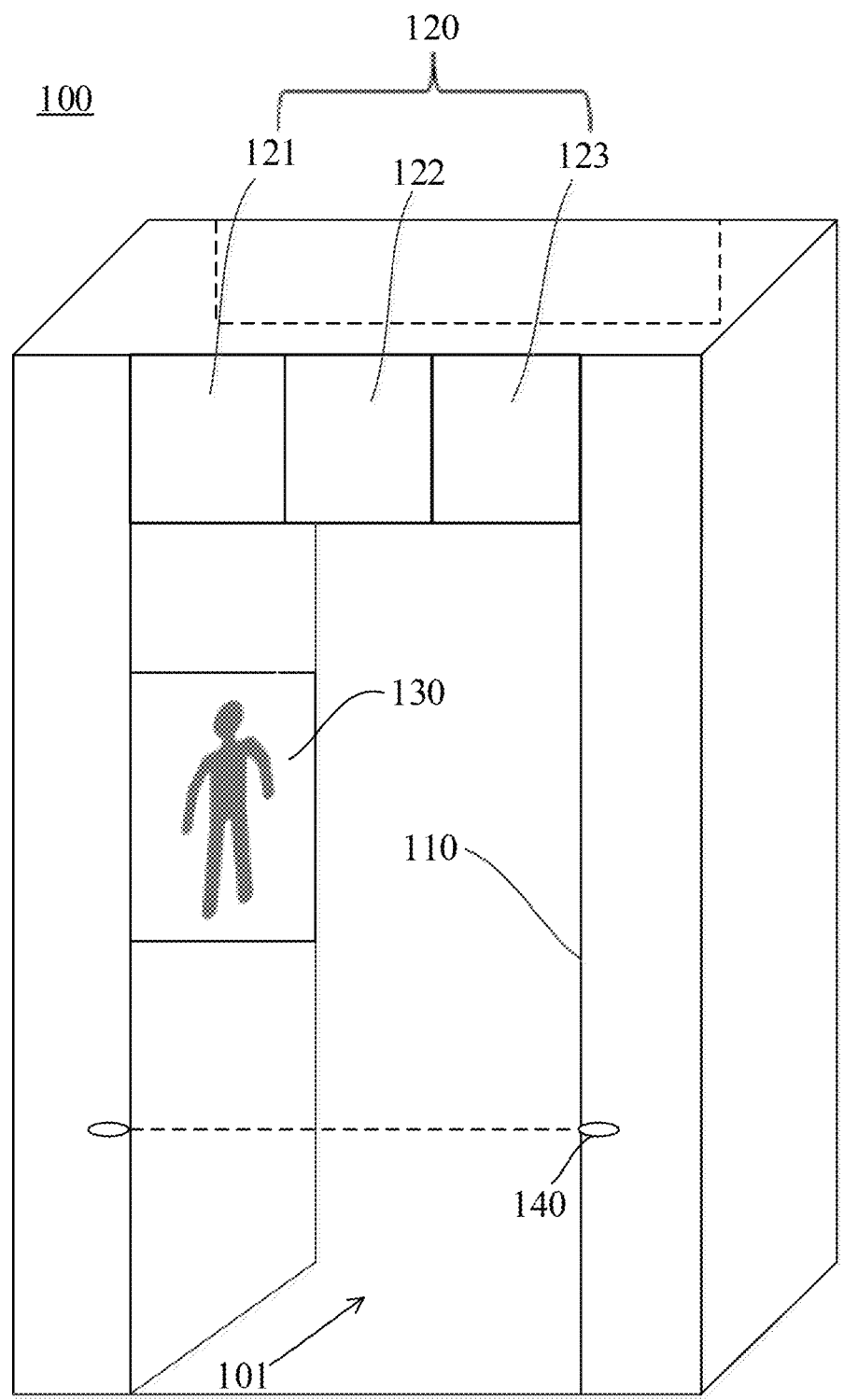
FIG. 1 shows a perspective view of a structure of a millimeter-wave human body security inspection instrument according to an exemplary embodiment of the present disclosure.
Figure 2:
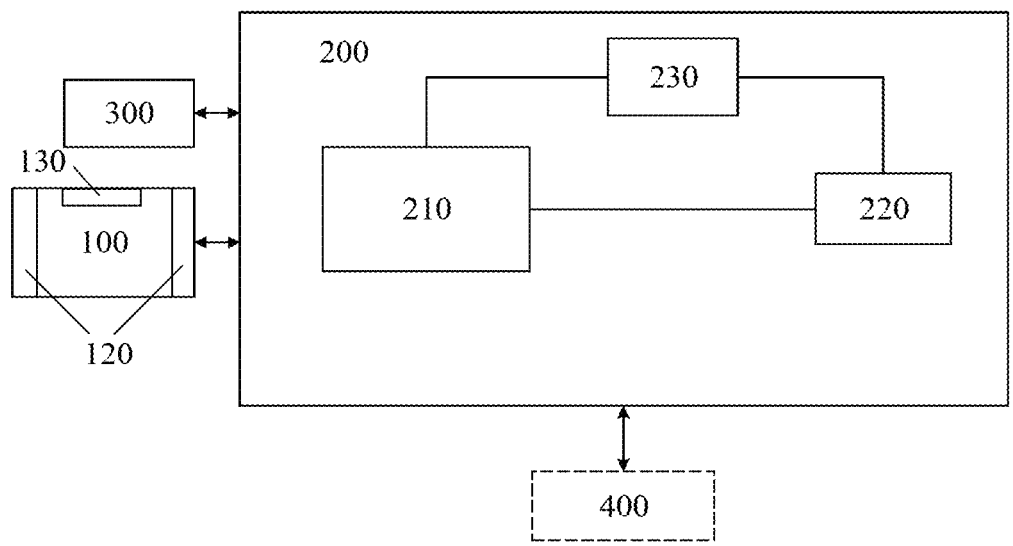
FIG. 2 shows a block diagram of an arrangement of a system of performing security inspection of human body based on millimeter-wave according to an exemplary embodiment of the present disclosure.
Figure 3:
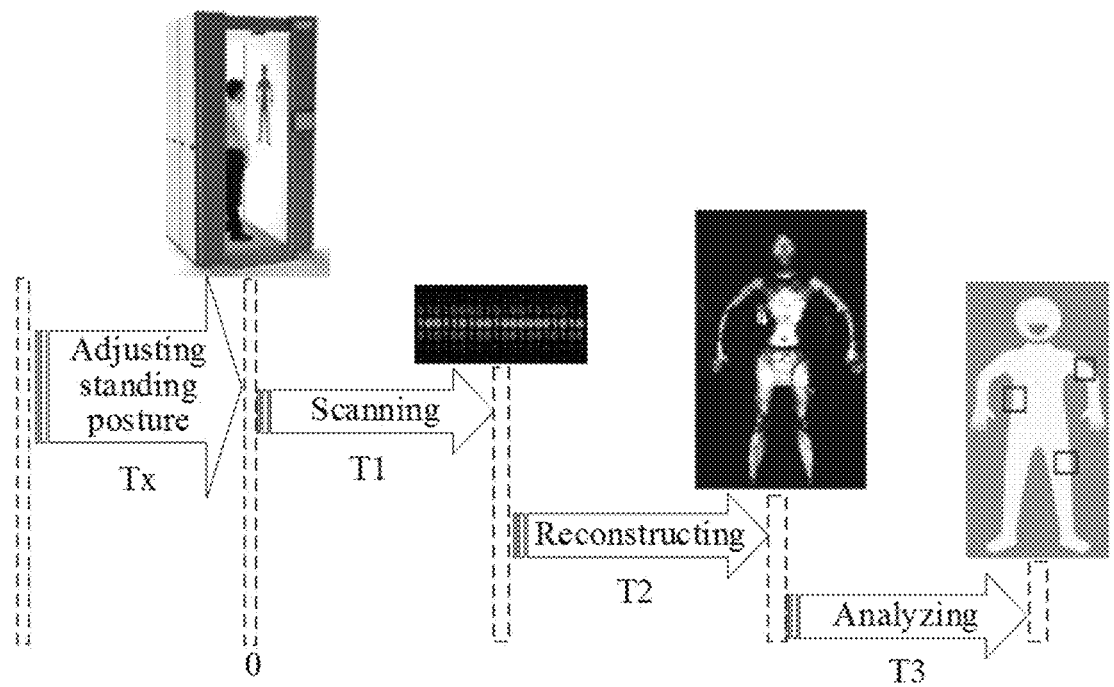
FIG. 3 shows a schematic diagram of a time distribution of human body security inspection according to the exemplary embodiment of the present disclosure.

FIG. 1 schematically shows a human body imaging device for security inspection according to an exemplary embodiment of the present disclosure. FIG. 2 schematically shows an arrangement of a system of performing security inspection of human body according to an exemplary embodiment of the present disclosure, and the system of performing security inspection includes the human body imaging device shown in FIG. 1. The human body imaging device is, for example, a millimeter-wave human body security inspection instrument 100, which is used for performing scanning on a body of a person to be inspected to obtain a millimeter-wave human body image or corresponding millimeter-wave scanning data. As shown in FIG. 3, a scanning duration is T1, which depends on specific operations of different types of millimeter-wave human body security inspection instruments, and for example, may be approximately 2 seconds. For example, the millimeter-wave human body security inspection instrument may achieve imaging, by collecting a millimeter-wave radiation of an object itself or by collecting a millimeter-wave reflected or scattered by the object, based on a passive or passive millimeter-wave imaging technology. For example, the millimeter-wave human body security inspection instrument may include a millimeter-wave transmitting and receiving device, such as a millimeter-wave antenna array for transmitting and receiving millimeter-wave signals and a millimeter-wave transceiver associated with the millimeter-wave antenna array.

The millimeter-wave human body security inspection instrument may include a cylindrical scanning system, a plane scanning system, and an area array scanning system. In the illustrated embodiment, the millimeter-wave human body security inspection instrument 100 is in a form of a security inspection gate, which defines an inspection channel 101. A security inspection is performed on the person to be inspected standing at a designated standing position within the inspection channel 101 in an appropriate standing posture. For example, the millimeter-wave human body security inspection instrument may include a linear array plane up and down scanning type security inspection gate, a linear array plane left and right scanning type security inspection gate, a polygonal line array up and down scanning security inspection gate, or a linear array turntable rotating security inspection gate, or an arc or a cylindrical scanning type security inspection gate. Accordingly, the millimeter-wave human body security inspection instrument may have different forms of scanning surfaces for scanning the body of the person to be inspected, such as a plane array scanning surface 110 shown in the drawing.

In the embodiment shown in FIG. 1, the millimeter-wave human body security inspection instrument in the form of the security inspection gate includes a first millimeter-wave scanning unit and a second millimeter-wave scanning unit arranged oppositely, such as a millimeter-wave transmitting and receiving device or a detector array. The first millimeter-wave scanning unit and the second millimeter-wave scanning unit are located on opposite sides of the inspection channel in a horizontal direction perpendicular to a direction of the person to be inspected passing through the inspection channel 101. The first millimeter-wave scanning unit and the second millimeter-wave scanning unit are used to perform millimeter-wave scanning on a front of the person to be inspected and a back of the person to be inspected standing at a designated standing position within the inspection channel 101 in the standing posture complying with a designated posture, respectively, so as to obtain a first scanning dataset related to the front of the person to be inspected and a second scanning dataset related to the back of the person to be inspected. Each of the first scanning dataset and the second scanning dataset may be in a form of two-dimensional data matrix, and a column direction of the first scanning dataset and a column direction of the second scanning dataset are identical to a height direction of the person to be inspected.

The system of security inspection further includes a workstation 200, such as an operation terminal in a central control room or an operation console, and for example, may be implemented by a computer. The workstation may reconstruct a millimeter-wave scanning image of the person to be inspected based on the obtained millimeter-wave scanning data, confirm the standing posture of the person to be inspected, and analyze the millimeter-wave scanning image to recognize whether the person to be inspected is carrying a suspected or prohibited item or not, etc. The workstation 200 itself has a processor 210, such as a central processing unit (CPU), for performing routine operations of the workstation; and a millimeter-wave scanning image, a result of determining the standing posture, and/or a result of recognizing the suspected item may be displayed by a monitor 230 of the workstation 200. As shown in FIG. 3, a duration of an image reconstruction is T2, and a duration of an image analysis is T3, which depend on a performance of processing data of the workstation. For example, a graphics card including a GPU (Graphics Processor) 220 may be used to accelerate the reconstruction of a scanned image and/or the image analysis.

In some examples, the image analysis includes a confirmation for the standing posture and a recognition of the suspected item, etc., that is, it may be determined, based on the reconstructed millimeter-wave scanning image, whether the standing posture of the person to be inspected meets a requirement of the designated posture or not when scanning the person to be inspected. In other examples, alternatively or additionally, it may be determined, based on a visible light image of the person to be inspected (for example, obtained through a separately disposed imaging device such as a camera), whether the standing posture of the person to be inspected meets the requirement of the designated posture or not when scanning the person to be inspected. It may be determined, in various methods, such as manual or automatic mode, whether the standing posture of the person to be inspected is correct or meets the requirement of the designated posture or not based on the image of the person to be inspected. For example, it may be determined whether a difference (such as a difference between boundaries of graphics) between an image of a character corresponding to the designated posture and the image (such as the millimeter-wave scanning image or the visible light image) of the person to be inspected is within a predetermined threshold range or not. In the manual mode, whether the standing posture of the person to be inspected meets the requirement of the designated posture or not may be manually determined by the operator based on the standing posture of the person to be inspected at the designated standing position or based on an image of the standing posture of the person to be inspected (for example, based on an image displayed on the monitor 230). Alternatively or additionally, whether the standing posture of the person to be inspected meets the requirement of the designated standing posture or not may be determined in the automatic mode, for example, by means of a processor. Alternatively or additionally, it may be determined whether the standing posture of the person to be inspected meets the requirement of the designated posture or not before scanning the body of the person to be inspected in the standing posture with the millimeter-wave human body security inspection instrument.

In the practical security inspection, for the millimeter-wave imaging system, it is usually required that the security inspection is performed on the person to be inspected in a designated posture. Different persons to be inspected have different understandings of a correct standing posture and may take different times to pose correctly. As a result, it takes a long duration Tx (see FIG. 3) for a person to be inspected to adjust his/her standing posture before formally scanning. The system of security inspection according to embodiments of the present disclosure further includes a first display device 120, which is disposed at a position that allows the person to be inspected to see it before entering the inspection channel 101, and displays information related to the designated posture expected to be taken by the person to be inspected when scanning the person to be inspected with the millimeter-wave human body security inspection instrument. Therefore, the person to be inspected may watch the information displayed by the first display device 120 when queuing up, waiting for inspection or when other inspected persons are being inspected, understand and learn a correct standing posture for scanning in advance. After entering the inspection channel 101 and standing in the designated standing position, the person to be inspected may immediately pose a posture substantially consistent with or complying with the designated standing posture, thereby reducing a probability of wrong standing posture of the person to be inspected, and greatly shortening the duration Tx for adjusting the standing posture.

The first display device may be disposed at any appropriate position where the first display device can be seen by the person to be inspected before entering the inspection channel 101. In the illustrated embodiment, the first display device 120 is disposed at a top of the millimeter-wave human body security inspection instrument 100 and located above an entrance of the inspection channel 101, so as to face to the person to be inspected who is about to enter the inspection channel. Alternatively, the first display device may be disposed on a side frame of the security inspection gate. In some examples, in a passing direction of the person to be inspected, each of two opposite tops of the millimeter-wave human body security inspection instrument is provided with the first display device. The person to be inspected may see information related to the designated posture displayed by the first display device before entering the inspection channel from any side of the security inspection instrument, so as to achieve forward and reverse inspection and passage of the millimeter-wave human body security inspection instrument, thereby improving a flexibility of an arrangement and an operation of the security inspection instrument, and improving an efficiency of security inspection.

The first display device may display information related to the designated posture to the person to be inspected in various methods, such as playing a video or an animation of posing the designated posture, displaying a text of prompting the designated posture or a picture of the designated posture, etc. For example, these information may be displayed in different regions 121, 122, and 123 of the first display device, respectively. The first display device may include a display screen, such as an LCD or LED display monitor, and may also include various graphics, image pointers/indicators, etc.

As shown in FIG. 1, the system of security inspection may further include a second display device 130, which may be disposed within the inspection channel, such as on the scanning surface 110, to display information related to the designated posture, such as an image of a character in the designated posture, to the person to be inspected standing at the designated standing position, so as to further clarify the requirement of the designated posture to the person to be inspected. In some examples, a visible light imaging device (not shown), such as a camera, may also be provided, the visible light imaging device is used to obtain a visible light image of the person to be inspected standing at the designated standing position within the inspection channel 101 in the standing posture. The visible light image may be displayed or projected on the second display device 130 to guide the person to be inspected to adjust his/her standing posture according to a comparison between the visible light image and the image of the character in the designated posture, so that the person to be inspected can quickly pose the standing posture that meets the requirement of the designated posture, thereby further shortening the duration for adjusting the standing posture. In addition, the obtained visible light image may also be sent to the workstation or the operator terminal, so as to determine whether the standing posture of the person to be inspected meets the requirement of scanning or not by the operator based on the visible light image or based on both the visible light image and the reconstructed millimeter-wave scanning image.

In some embodiments, the system of performing security inspection of human body based on millimeter-wave may further include an audio device 300, such as a speaker, the audio device 300 is used to guide the person to be inspected to see the information displayed by the first display device 120 through a voice prompt, and/or guide the person to be inspected to stand at the designated standing position within the inspection channel in the standing posture substantially complying with the designated posture, so as to further shorten the duration for adjusting the standing posture. In addition, the audio device 300 communicates with the workstation or the operator terminal. It is possible to play prompt information to the person to be inspected as desired by using the audio device 300, such as, guiding the person to be inspected to see the information displayed by the first display device 120, reminding the person to be inspected to enter the inspection channel as soon as possible, guiding the person to be inspected to pose an appropriate posture within the inspection channel, precautions about scanning, reminding that scanning is completed, guiding the person to be inspected to leave the inspection channel as soon as possible, and guiding the person to be inspected to a manual inspection station 400 for further inspecting as required, etc., so as to minimize the time the person to be inspected spends undergoing the security inspection.

In some embodiments, as shown in FIG. 1, the system of performing security inspection of human body based on millimeter-wave may further include a triggering device 140, which is, for example, disposed at an entrance of the security inspection gate or the entrance of the inspection channel 101. When the person to be inspected enters the inspection channel, the triggering device is triggered or activated, which may cause the audio device 300 to play a voice prompt and/or cause the second display device 130 to display information related to the designated posture and perform guiding on the standing posture of the person to be inspected, such as guiding the person to be inspected to see the information displayed by the second display device 130, so as to cause the person to be inspected to stand at the designated standing position within the inspection channel in the standing posture substantially complying with the designated posture, thereby further shortening the duration for adjusting the standing posture. As an example, the triggering device may take a form of an active infrared intrusion switch or the like.

If the standing posture of the person to be inspected is incorrect or does not meet the requirement of the designated posture, the system of security inspection will guide the person to be inspected to adjust his/her standing posture (such as using the above display devices and/or the audio device), and re-perform millimeter-wave scanning, the reconstruction of the image and the confirmation for the standing posture. According to embodiments of the present disclosure, the system of security inspection guides the person to be inspected to leave the inspection channel through the voice prompt and/or a visual prompt, after determining that the standing posture of the person to be inspected meets the requirement of the designated posture. The workstation analyzes the reconstructed millimeter-wave scanning image to recognize whether the person to be inspected is carrying the suspected item or not when the person to be inspected is leaving the inspection channel. When the person to be inspected is walking out of the inspection channel, the operation of performing image analysis to recognize the suspected item by the workstation is performed at the same time. In this way, the person to be inspected does not need to spend time waiting in the inspection channel for the suspected item to be recognized, so as to further reduce a residence time for the person to be inspected within the inspection channel. In addition, the next person to be inspected may enter the inspection channel and pose a standing posture, so as to improve an efficiency of the entire system of security inspection.

"Image reconstruction" refers to a reconstruction of acquired binary scanning data into a visual image. In some cases, when the scanning units on both sides of the security inspection instrument respectively acquire scanning data related to the front of the person to be inspected and scanning data related to the back of the person to be inspected, a height of the person to be inspected corresponding to the scanning data related to the front of the person to be inspected may not be identical to a height of the person to be inspected corresponding to the scanning data related to the back of the person to be inspected. It is possible to perform a registration between the scanning data related to the front of the person to be inspected and the scanning data related to the back of the person to be inspected for further analysis. In some embodiments of the present disclosure, in addition to using the graphics card including the GPU (Graphics Processor) to accelerate scanning image reconstruction and/or image analysis, the following method of registering data is also provided to further accelerate image reconstruction.

Figure 6:
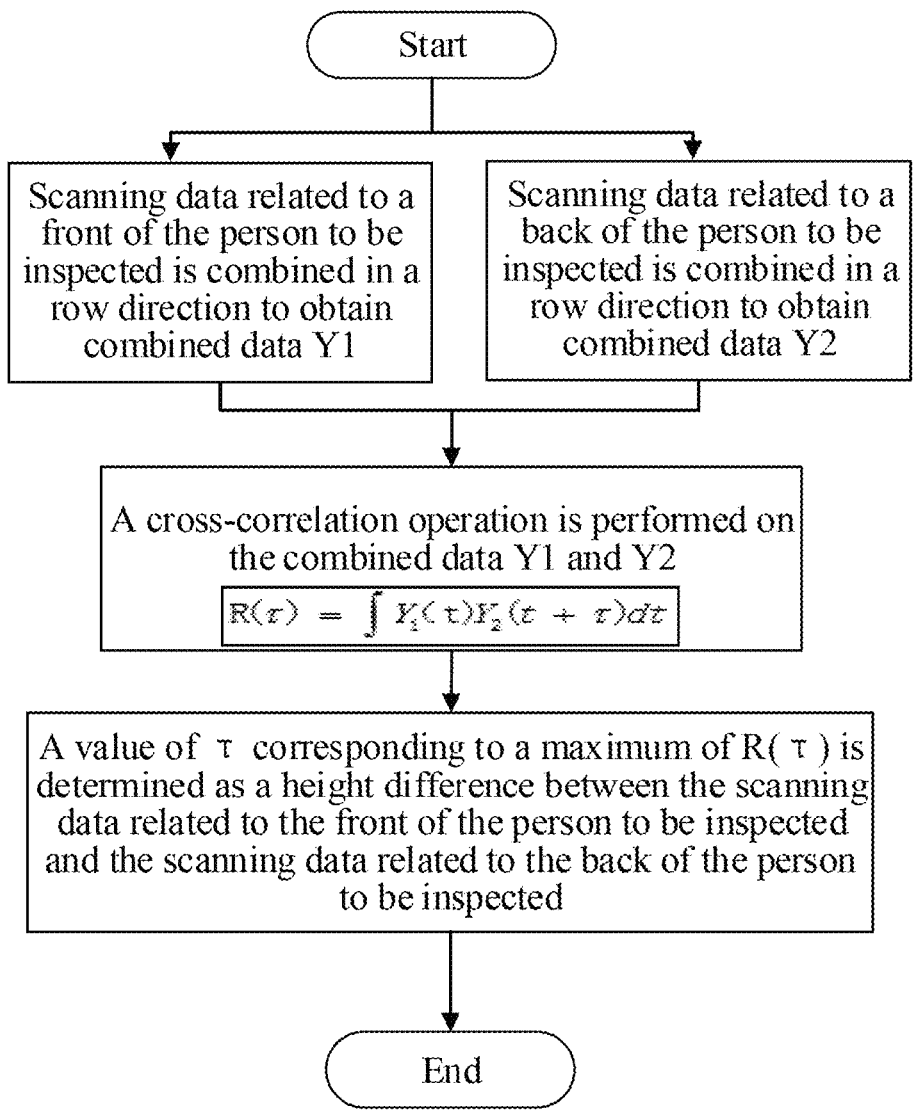
FIG. 6 shows a flowchart of a method of registering scanning data according to a specific example of the present disclosure.

For example, a registration is performed on the above scanning data at the workstation. For example, as shown in FIG. 6, the following operations may be performed by the workstation or a GPU of the workstation.

Columns of the first scanning dataset related to the front of the person to be inspected are combined in a row direction of the first scanning dataset to obtain a column of the first combined data represented by Y1, and columns of a second scanning dataset related to the back of the person to be inspected are combined in a row direction of the second scanning dataset to obtain a column of the second combined data represented by Y2. For example, this combination may be to combine data in a same row of each scanning dataset, and the column of the formed combined data is a column of one-dimensional data.

Then, a cross-correlation operation, such as a convolution operation, is performed on the obtained first combined data Y1 and the obtained second combined data Y2 according to the following equation:

$$R(\tau) = \int Y_1(t) Y_2(t+\tau) dt$$

where t is a height corresponding to the first combined data Y1 or the second combined data Y2, and $\tau$ may represent a height difference between the scanning data in the first scanning dataset and the corresponding scanning data in the second scanning dataset; and a value of τ corresponding to a maximum of R(τ) is determined as a height difference between the first scanning dataset and the second scanning dataset, and a registration between the first scanning dataset and the second scanning dataset is performed based on the height difference, so as to perform the reconstruction of millimeter-wave scanning image of the person to be inspected.

By adopting this simple and feasible registration method, it is possible to achieve a rapid registration between the scanning data related to the front of the person to be inspected and the scanning data related to the back of the person to be inspected, so as to further shorten the duration for image reconstruction.

Figure 4:
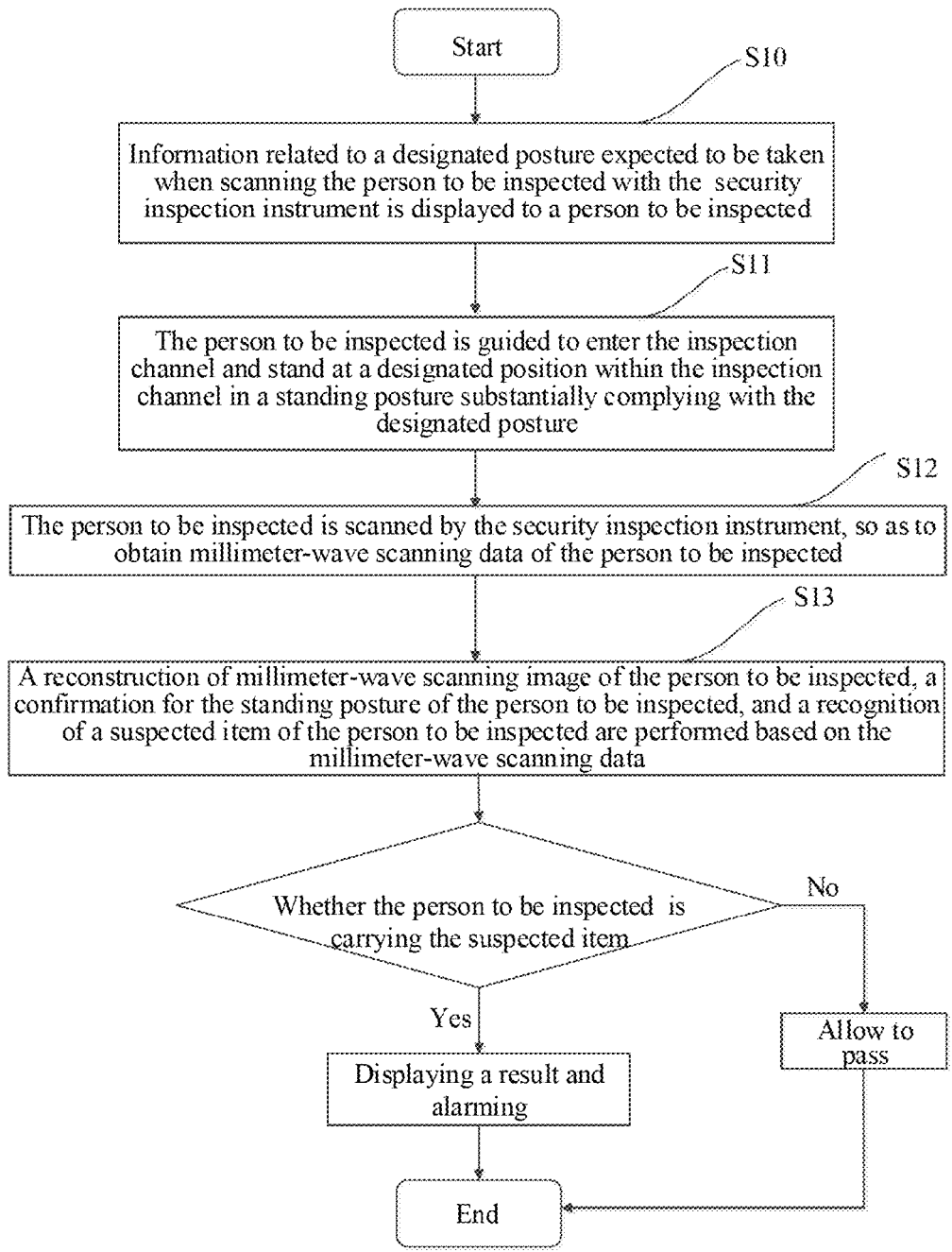
FIG. 4 shows a flowchart of a method of performing security inspection of human body based on millimeter-wave according to the embodiment of the present disclosure.
Figure 5:
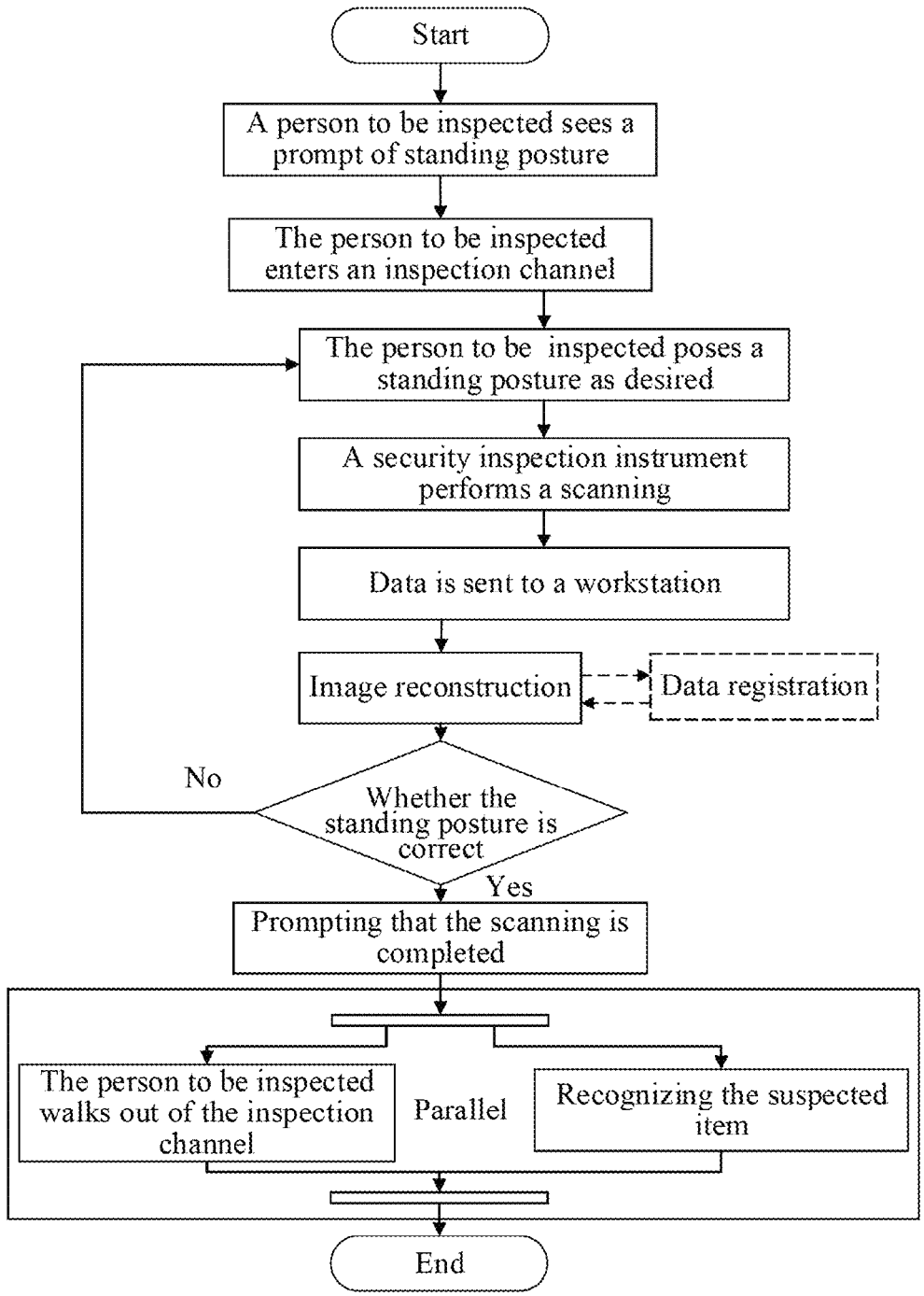
FIG. 5 shows a flowchart of a method of performing security inspection of human body based on millimeter-wave according to a specific example of the present disclosure.

Embodiments of the present disclosure further provides a method of performing security inspection on human body based on millimeter-wave scanning of human body, which may be implemented by, for example, the system of performing security inspection of human body described above. With this method, the residence time of the person to be inspected within the inspection channel may be reduced and the passing efficiency may be improved. FIGS. 4 and 5 respectively illustrate flowcharts of the method of performing security inspection of human body based on millimeter-wave according to exemplary embodiments of the present disclosure. This method mainly includes steps S10 to S13.

In S10, before an person to be inspected enters an inspection channel defined by a millimeter-wave human body security inspection instrument, information related to a designated posture expected to be taken when scanning the person to be inspected with the millimeter-wave human body security inspection instrument is displayed to the person to be inspected, for example, by a first display device.

In S11, the person to be inspected is guided to enter the inspection channel and stand at a designated standing position within the inspection channel in a standing posture substantially complying with the designated posture.

In S12, the person to be inspected is scanned by the millimeter-wave human body security inspection instrument, so as to obtain millimeter-wave scanning data.

In S13, various operations, such as reconstructing the millimeter-wave scanning image of the person to be inspected, confirming whether the standing posture of the person to be inspected meets a requirement of the designated posture or not when scanning the person to be inspected, and recognizing whether the person to be inspected is carrying a suspected item or not, are performed by a workstation based on the millimeter-wave scanning data. For example, these operations may be accelerated by using a graphics processor (GPU) at the workstation.

In order to further shorten the duration for image reconstruction, as shown in FIG. 6, the following data registration operation may be performed by the workstation or a GPU of the workstation.

Columns of the first scanning dataset related to the front of the person to be inspected are combined in a row direction of the first scanning dataset to obtain a column of the first combined data represented by Y1, and columns of a second scanning dataset related to the back of the person to be inspected are combined in a row direction of the second scanning dataset to obtain a column of the second combined data represented by Y2.

A cross-correlation operation, such as a convolution operation, is performed on the obtained first combined data Y1 and the obtained second combined data Y2 according to the following equation:

$$R(\tau)=\int Y_1(t)Y_2(t+\tau)dt$$

where t is a height corresponding to the first combined data Y1 or the second combined data Y2, and τ represents a height difference between the scanning data in the first scanning dataset and the corresponding scanning data in the second scanning dataset; and a value of τ corresponding to a maximum of R(τ) is determined as a height difference between the first scanning dataset and the second scanning dataset, and a registration between the first scanning dataset and the second scanning dataset is performed based on the height difference, so as to perform the reconstruction of millimeter-wave scanning image of the person to be inspected.

When it is determined that the person to be inspected is suspected of carrying a prohibited item, the result may be displayed to the operator, and if necessary, an alarm may be issued to guide the person to be inspected suspected of carrying the prohibited item to undergo further inspection, such as manual inspection at the manual inspection station. When it is determined that the person to be inspected is not carrying the prohibited item, the person to be inspected may be allowed to pass, and then it may be performed the security inspection on next person to be inspected.

The first display device may be disposed on the millimeter-wave human body security inspection instrument, be disposed at the top of the millimeter-wave human body security inspection instrument and be located above the entrance of the inspection channel, so as to allow the person to be inspected to see the information displayed by the first display device before entering the inspection channel. The first display device may display a video of posing the designated posture, a text of prompting the designated posture, or a picture of the designated posture, etc., to the person to be inspected. As a result, the person to be inspected may watch the information displayed by the first display device when queuing up, waiting for inspection or when other inspected persons are being inspected, understand and learn a correct standing posture for scanning in advance. After entering the inspection channel and standing in the designated standing position, the person to be inspected may immediately pose a posture substantially consistent with or complying with the designated standing posture, so as to reduce a probability of wrong standing posture of the person to be inspected, and greatly shorten the duration for adjusting the standing posture.

Furthermore, when the person to be inspected is located within the inspection channel, the second display device may also display information related to the designated posture to the person to be inspected standing at the designated standing position. For example, the second display device may display an image of a character in the designated posture, and may also acquire a visible light image of the person to be inspected standing at the designated standing position and display the visible light image to guide the person to be inspected to adjust his/her standing posture according to a comparison between the visible light image and the image of the character in the designated posture. In some examples, as assistance, it may be possible to guide the person to be inspected to see the information displayed by the first display device and/or guide the person to be inspected to stand at the designated standing position in a standing posture substantially complying with the designated posture through a voice prompt.

As mentioned above, it may be determined whether the standing posture of the person to be inspected meets the requirement of the designated posture or not based on the reconstructed millimeter-wave scanning image, the visible light image of the standing posture of the person to be inspected acquired separately, or both the reconstructed millimeter-wave scanning image and the visible light image. In some embodiments of the present disclosure, after determining that the standing posture of the person to be inspected meets the requirement of the designated posture, the person to be inspected is guided to leave the inspection channel. When the person to be inspected is leaving the inspection channel, the reconstructed millimeter-wave scanning image is analyzed to recognize whether the person to be inspected is carrying the suspected item or not. Therefore, the person to be inspected does not need to spend time waiting in the inspection channel for the suspected item to be recognized, so as to reduce a residence time for the person to be inspected within the inspection channel and improve a passing efficiency of the entire system of security inspection.

Although embodiments of the present disclosure have been illustrated and described, it may be understood by those of ordinary skill in the art that these embodiments may be changed without departing from the principle and spirit of the present disclosure. The scope of the present disclosure is defined by the appended claims and their equivalents.

What is claimed is:

1. A method of performing security inspection of human body based on millimeter-wave, comprising:
    displaying, by a first display device, information related to a designated posture to a person to be inspected before the person to be inspected enters an inspection channel defined by a millimeter-wave human body security inspection instrument, wherein the designated posture is expected to be taken by the person to be inspected when scanning the person to be inspected with the millimeter-wave human body security inspection instrument;
    guiding, by an audio device, the person to be inspected to enter the inspection channel and stand at a designated standing position within the inspection channel in a standing posture substantially complying with the designated posture through a voice prompt;
    scanning, by the millimeter-wave human body security inspection instrument, the person to be inspected, so as to obtain millimeter-wave scanning data of the person to be inspected; and
    performing, by a workstation, a reconstruction of millimeter-wave scanning image of the person to be inspected, a confirmation for the standing posture of the person to be inspected, and a recognition of a suspected item of the person to be inspected, based on the millimeter-wave scanning data,
    wherein the method further comprises:
    acquiring a first scanning dataset related to a front of the person to be inspected and a second scanning dataset related to a back of the person to be inspected, wherein a column direction of the first scanning dataset and a column direction of the second scanning dataset are identical to a height direction of the person to be inspected;
    combining, in a row direction of the first scanning dataset, columns of the first scanning dataset to obtain a column of first combined data represented by Y1, and combining, in a row direction of the second scanning dataset, columns of the second scanning dataset to obtain a column of second combined data represented by Y2;
    performing a cross-correlation operation on the first combined data Y1 and the second combined data Y2 according to an equation:

$$R(\tau)=\int Y_1(t)Y_2(t+\tau)dt$$

where t is a height corresponding to the first combined data Y1 or the second combined data Y2; and
    determining a value of $\tau$ corresponding to a maximum of $R(\tau)$ as a height difference between the first scanning dataset and the second scanning dataset, and performing a registration between the first scanning dataset and the second scanning dataset based on the height difference, so as to perform the reconstruction of millimeter-wave scanning image of the person to be inspected.

2. The method of performing security inspection of human body based on millimeter-wave of claim 1, wherein the first display device is disposed at a top of the millimeter-wave human body security inspection instrument, so as to allow the person to be inspected to see the information displayed by the first display device before entering the inspection channel.

3. The method of performing security inspection of human body based on millimeter-wave of claim 1, wherein at least one of a video of posing the designated posture, a text of prompting the designated posture, or a picture of the designated posture is displayed to the person to be inspected by the first display device.

4. The method of performing security inspection of human body based on millimeter-wave of claim 1, further comprising:
    displaying, by a second display device, information related to the designated posture to the person to be inspected standing at the designated standing position within the inspection channel.

5. The method of performing security inspection of human body based on millimeter-wave of claim 4, wherein an image of a character in the designated posture is displayed by the second display device, and
    wherein the method further comprises:
    acquiring a visible light image of the person to be inspected standing at the designated standing position in the standing posture, and displaying the visible light image on the second display device, so as to guide the person to be inspected to adjust the standing posture of the person to be inspected according to a comparison between the visible light image and the image of the character in the designated posture.

6. The method of performing security inspection of human body based on millimeter-wave of claim 1, further comprising:
    guiding, by the audio device, the person to be inspected to see the information displayed by the first display device through the voice prompt.

7. The method of performing security inspection of human body based on millimeter-wave of claim 1, wherein determining whether the standing posture of the person to be inspected meets a requirement of the designated posture or not is performed based on a reconstructed millimeter-wave scanning image.

8. The method of performing security inspection of human body based on millimeter-wave of claim 1, further comprising:
    performing, by a graphics processing unit GPU at the workstation, the reconstruction of millimeter-wave scanning image of the person to be inspected, the confirmation for the standing posture of the person to be inspected and the recognition of the suspected item of the person to be inspected.

9. The method of performing security inspection of human body based on millimeter-wave of claim 1, further comprising:
guiding the person to be inspected to leave the inspection channel after determining that the standing posture of the person to be inspected meets a requirement of the designated posture; and
analyzing a reconstructed millimeter-wave scanning image to recognize whether the person to be inspected is carrying the suspected item or not when the person to be inspected is leaving the inspection channel.

10. A system of performing security inspection of human body based on millimeter-wave, comprising:
a millimeter-wave human body security inspection instrument, wherein the millimeter-wave human body security inspection instrument defines an inspection channel, and is configured to scan a person to be inspected standing at a designated standing position within the inspection channel, so as to acquire millimeter-wave scanning data of the person to be inspected;
a first display device disposed at a position which is viewable by the person to be inspected before the person to be inspected enters the inspection channel, wherein the first display device is configured to display information related to a designated posture, which is expected to be taken by the person to be inspected when the scanning the person to be inspected with the millimeter-wave human body security inspection instrument; and
a workstation configured to perform a reconstruction of millimeter-wave scanning image of the person to be inspected, a confirmation for a standing posture of the person to be inspected and a recognition of a suspected item of the person to be inspected based on the millimeter-wave scanning data,
wherein the millimeter-wave human body security inspection instrument comprises:
a first millimeter-wave scanning unit and a second millimeter-wave scanning unit on opposite sides of the inspection channel in a horizontal direction perpendicular to a direction of the person to be inspected passing through the inspection channel, wherein the first millimeter-wave scanning unit and the second millimeter-wave scanning unit are configured to perform millimeter-wave scanning on a front of the person to be inspected and a back of the person to be inspected standing at the designated standing position in the standing posture complying with the designated posture, respectively, so as to obtain a first scanning dataset related to the front of the person to be inspected and a second scanning dataset related to the back of the person to be inspected, and wherein a column direction of the first scanning dataset and a column direction of the second scanning dataset are identical to a height direction of the person to be inspected, and
wherein the workstation is further configured to:
combine, in a row direction of the first scanning dataset, columns of the first scanning dataset to obtain a column of first combined data represented by Y1, and combine, in a row direction of the second scanning dataset, columns of the second scanning dataset to obtain a column of second combined data represented by Y2;
perform a cross-correlation operation on the first combined data Y1 and the second combined data Y2 according to an equation:

$$R(\tau) = \int Y_1(t) Y_2(t+\tau) dt$$

where t is a height corresponding to the first combined data Y1 or the second combined data Y2; and
determine a value of $\tau$ corresponding to a maximum of $R(\tau)$ as a height difference between the first scanning dataset and the second scanning dataset, and perform a registration between the first scanning dataset and the second scanning dataset based on the height difference, so as to perform the reconstruction of millimeter-wave scanning image of the person to be inspected.

11. The system of performing security inspection of human body based on millimeter-wave of claim 10, wherein the first display device is disposed at a top of the millimeter-wave human body security inspection instrument to face to the person to be inspected being about to enter the inspection channel.

12. The system of performing security inspection of human body based on millimeter-wave of claim 11, wherein a number of first display devices is two, and each of two opposite tops of the millimeter-wave human body security inspection instrument is provided with one first display device in a passing direction of the person to be inspected.

13. The system of performing security inspection of human body based on millimeter-wave of claim 10, wherein the first display device is configured to display at least one of a video of posing the designated posture, a text of prompting the designated posture, or a picture of the designated posture to the person to be inspected.

14. The system of performing security inspection of human body based on millimeter-wave of claim 10, further comprising:
a second display device disposed within the inspection channel to display information related to the designated posture to the person to be inspected standing at the designated standing position.

15. The system of performing security inspection of human body based on millimeter-wave of claim 14, further comprising:
a visible light imaging device configured to acquire a visible light image of the person to be inspected standing at the designated standing position in the standing posture,
wherein the second display device is configured to display an image of a character in the designated posture and the visible light image to guide the person to be inspected to adjust the standing posture of the person to be inspected according to a comparison between the visible light image and the image of the character in the designated posture,
the system of performing security inspection of human body based on millimeter-wave further comprising:
an audio device configured to guide the person to be inspected to see the information displayed by the first display device and/or to stand at the designated standing position in the standing posture substantially complying with the designated posture through a voice prompt.

16. The system of performing security inspection of human body based on millimeter-wave of claim 10, wherein the workstation is configured to determine whether the standing posture of the person to be inspected meets a requirement of the designated posture or not based on a reconstructed millimeter-wave scanning image.

17. The system of performing security inspection of human body based on millimeter-wave of claim 10, wherein the workstation comprises a graphics processing unit GPU configured to perform the reconstruction of millimeter-wave scanning image of the person to be inspected, the confirmation for the standing posture of the person to be inspected and the recognition of the suspected item of the person to be inspected.

18. The system of performing security inspection of human body based on millimeter-wave of claim 10, wherein the system of performing security inspection of human body based on millimeter-wave is configured to guide the person to be inspected to leave the inspection channel through a voice prompt and/or a visual prompt after determining that the standing posture of the person to be inspected meets a requirement of the designated posture, and the workstation is configured to analyze a reconstructed millimeter-wave scanning image to recognize whether the person to be inspected is carrying the suspected item or not when the person to be inspected is leaving the inspection channel.

\* \* \* \* \*